(12) United States Patent
Nie et al.

(10) Patent No.: US 12,085,004 B1
(45) Date of Patent: Sep. 10, 2024

(54) SWIRL STRUCTURE-BASED EXHAUST AFTERTREATMENT DEVICE FOR UNDERGROUND MINING DIESEL VEHICLE

(71) Applicant: SHANDONG UNIVERSITY OF SCIENCE AND TECHNOLOGY, Qingdao (CN)

(72) Inventors: Wen Nie, Qingdao (CN); Chengyi Liu, Qingdao (CN); Yun Hua, Qingdao (CN); Weimin Cheng, Qingdao (CN); Xiao Yan, Qingdao (CN); Fengning Yu, Qingdao (CN); Zilian Zhu, Qingdao (CN); Jie Lian, Qingdao (CN); Chenwang Jiang, Qingdao (CN); Chuanxing Cheng, Qingdao (CN); Haonan Zhang, Qingdao (CN)

(73) Assignee: SHANDONG UNIVERSITY OF SCIENCE AND TECHNOLOGY, Qingdao (CN)

( * ) Notice: Subject to any disclaimer, the term of this patent is extended or adjusted under 35 U.S.C. 154(b) by 0 days.

(21) Appl. No.: 18/395,886

(22) Filed: Dec. 26, 2023

Related U.S. Application Data

(63) Continuation of application No. PCT/CN2023/138370, filed on Dec. 13, 2023.

(30) Foreign Application Priority Data

Mar. 31, 2023 (CN) .......................... 202310332173.2

(51) Int. Cl.
*F01N 3/28* (2006.01)
*F01N 3/033* (2006.01)
(Continued)

(52) U.S. Cl.
CPC ........... *F01N 3/2892* (2013.01); *F01N 3/033* (2013.01); *F01N 3/035* (2013.01); *F01N 3/037* (2013.01);
(Continued)

(58) Field of Classification Search
CPC ........ F01N 3/2892; F01N 3/033; F01N 3/035; F01N 3/037; F01N 3/24; F01N 13/009;
(Continued)

(56) References Cited

U.S. PATENT DOCUMENTS

| | | | | |
|---|---|---|---|---|
| 5,626,017 A | * | 5/1997 | Sattelmayer | F23R 3/40 60/737 |
| 7,490,467 B2 | * | 2/2009 | Cummings | F01N 3/36 60/274 |
| 2020/0123955 A1 | * | 4/2020 | Liu | B01F 25/31425 |

FOREIGN PATENT DOCUMENTS

| | | | | |
|---|---|---|---|---|
| CN | 108331640 A | * | 7/2018 | ............... F01N 3/02 |
| CN | 116357432 A | * | 6/2023 | |

* cited by examiner

*Primary Examiner* — Laert Dounis
(74) *Attorney, Agent, or Firm* — Daniel M. Cohn; Howard M. Cohn

(57) ABSTRACT

A swirl structure-based exhaust aftertreatment device for an underground mining diesel vehicle comprises a water tank, a PM collection tank, an inlet tube, a high-speed rotary exhaust separator, an exhaust catalytic converter, a circulating NOx selective catalytic reduction system and an exhaust tube. The high-speed rotary exhaust separator comprises a Laval tube, a throat tube, a swirl tube and a first deposition tube. The concentration of toxic and harmful components in exhaust can be decreased below a concentration threshold, thus avoiding pipeline blockage caused by PM accumulation.

7 Claims, 1 Drawing Sheet

(51) Int. Cl.
  *F01N 3/035*  (2006.01)
  *F01N 3/037*  (2006.01)
  *F01N 3/24*  (2006.01)
  *F01N 13/00*  (2010.01)

(52) U.S. Cl.
  CPC ............ *F01N 3/24* (2013.01); *F01N 13/009* (2014.06); *F01N 2330/38* (2013.01); *F01N 2470/30* (2013.01); *F01N 2560/026* (2013.01); *F01N 2590/08* (2013.01); *Y02A 50/20* (2018.01)

(58) Field of Classification Search
  CPC ............ F01N 2330/38; F01N 2470/30; F01N 2560/026; F01N 2590/08
  See application file for complete search history.

SWIRL STRUCTURE-BASED EXHAUST AFTERTREATMENT DEVICE FOR UNDERGROUND MINING DIESEL VEHICLE

BACKGROUND OF THE INVENTION

1. Technical Field

The invention belongs to the technical field of exhaust treatment and environmental protection, and particularly relates to a swirl structure-based exhaust aftertreatment device for an underground mining diesel vehicle, which is particularly suitable for external purification of exhaust discharged by the underground mining diesel vehicle.

2. Description of Related Art

To satisfy various requirements of mine production, mining diesel vehicles with a high load capacity, high transport efficiency and good safety (such as trackless rubber-tired vehicles) are widely used by coal mine enterprises as main underground auxiliary transport equipment. Because an internal combustion engine is used for providing traction power for mining diesel vehicles, when the air-fuel ratio (A/F) is less than 14.3, diesel oil will not be sufficiently burnt, and in this case, a large quantity of toxic and harmful exhaust components such as carbon monoxide (CO), hydrocarbon (HC), nitrogen oxides (NOx), PM (particulate matter) will be produced. Due to the large sectional area, small air volume and low air velocity of underground tunnels and the dead slow ventilation of working surfaces, exhaust discharged by mining diesel vehicles cannot be dissipated in time and will be accumulated. When multiple components are produced at the same time and interact mutually, the health of workers under the mine will be seriously endangered. Therefore, it is necessary to take measures to reduce exhaust pollution of underground mining diesel vehicles.

At present, exhaust aftertreatment techniques for diesel vehicles mainly include the internal purification technique and the external purification technique. Due to the equilibrium relationship between the NOx purification effect and the PM purification effect of the internal purification technique, it is more necessary to develop the external exhaust purification technique for diesel vehicles. The external purification technique can only purify one or several exhaust components, and the decrease of NOx emission and the decrease of PM emission of diesel vehicles are contradictory. Generally, a technique beneficial to the decrease of NOx emission will lead to an increase of PM emission, and a technique beneficial to the decrease of PM emission will lead to an increase of NOx emission. Existing exhaust aftertreatment devices generally have the problems of low exhaust purification efficiency, poor exhaust purification effect, blockage and failures caused by exhaust PM accumulation, and secondary pollution caused by toxic and harmful gas leaking from a catalytic system.

BRIEF SUMMARY OF THE INVENTION

The invention aims to provide a swirl structure-based exhaust aftertreatment device for an underground mining diesel vehicle, which can reduce the concentration of toxic and harmful components such as NOx and PM in exhaust discharged by the underground mining diesel vehicle below a concentration threshold, avoid pipeline blockage and failures caused by PM accumulation of existing exhaust aftertreatment devices, and avoid secondary pollution caused by leaking of toxic and harmful gas such as $NH_3$, thus reducing exhaust emission of the underground mining diesel vehicle and improving the exhaust purification efficiency.

For this purpose, the invention adopts the following technical solution: a swirl structure-based exhaust aftertreatment device for an underground mining diesel vehicle comprises a water tank, a PM collection tank, an inlet tube, a high-speed rotary exhaust separator, an exhaust catalytic converter, a circulating NOx selective catalytic reduction system and an exhaust tube, wherein the inlet tube, the high-speed rotary exhaust separator, the exhaust catalytic converter, the circulating NOx selective catalytic reduction system and the exhaust tube are sequentially connected from front to back;

the high-speed rotary exhaust separator comprises a Laval tube, a throat tube, a swirl tube and a first deposition tube which are sequentially connected from front to back, the Laval tube is a constricted section, the swirl tube is an expanded section, the Laval tube is connected to the inlet tube, and the first deposition tube is connected to the water tank through a first pipeline and is connected to the PM collection tank through a second pipeline; an overflow tube for connecting the Laval tube and the swirl tube is mounted in the throat tube, an internal swirl unit and an external swirl unit which are as long as the swirl tube are mounted in the swirl tube, and a front end of the internal swirl unit is inserted into the overflow tube; automatic flow control valves are arranged on the first pipeline and the second pipeline respectively, a sprayer is mounted at a tail end of the first pipeline, and a pressure sensor is arranged on the first deposition tube and is used for feeding back a signal to control the automatic flow control valves;

wavy ducts and straight ducts are arranged in the exhaust catalytic converter; all ducts below a central axis are wavy ducts, front ends of the ducts are open, and tail ends of the ducts are closed; ducts above the central axis are wavy ducts and straight ducts, front ends of the dusts are closed, tail ends of the ducts are open, and the straight ducts are arranged along an inner wall of the exhaust catalytic converter; the ducts below the central axis are connected at peaks, the wavy ducts above the central axis are connected at peaks and are connected to the straight ducts at corresponding positions, the two ducts adjacent to the central axis are connected, peaks of the adjacent ducts on the central axis are connected to troughs of the adjacent ducts below the central axis, and inner walls of all the ducts are coated with a perovskite catalyst;

the circulating NOx selective catalytic reduction system comprises an $NH_3$ storage tank, an $NH_3$ recycling tank, a multi-component mixing tube, a swirl reactor and a second deposition tube, wherein the multi-component mixing tube, the swirl reactor and the second deposition tube are sequentially connected from front to back, the multi-component mixing tube is connected to the second deposition tube through a return tube, the second deposition tube is connected to the water tank through a third pipeline and is connected to the $NH_3$ recycling tank through a fourth pipeline, the $NH_3$ storage tank is connected to the multi-component mixing tube through a fifth pipeline, an electric damper is arranged in the vicinity of a tail end of an interior of the second deposition tube, automatic flow control valves are arranged on the third pipeline, the fourth pipeline and the fifth pipeline respectively, and sprayers are mounted at tail ends of the third pipeline and the fifth pipeline; an NOx sensor for monitoring a concentration of NOx and a pressure sensor for monitoring an internal pressure and a spraying pressure of $NH_3$ are arranged on the multi-component mixing tube, and an NOx sensor for monitoring the concentration of NOx, an $NH_3$ sensor for monitoring the concentration of $NH_3$, and a pressure sensor for feeding back a signal to control the electric damper and the corresponding automatic flow control valves are arranged on the second deposition tube.

Preferably, gauges are arranged on the first pipeline and the third pipeline.

Further preferably, a carbon tetrachloride and dilute sulfuric acid mixed solution is contained in the $NH_3$ recycling tank, carbon tetrachloride is located on a lower layer, dilute sulfuric acid is located on an upper layer, the fourth pipeline is a drying tube which is connected to a bottom of the $NH_3$ recycling tank to prevent $NH_3$ from flowing back or escaping.

Further preferably, the perovskite catalyst is a lanthanide perovskite catalyst.

Further preferably, a temperature sensor is also arranged on the first deposition tube.

Further preferably, the swirl reactor is composed of a Laval tube, a throat tube, a swirl tube, an overflow tube, an internal swirl unit and an external swirl unit, and a connection structure of the Laval tube, the throat tube, the swirl tube, the overflow tube, the internal swirl unit and the external swirl unit of the swirl reactor is the same as the connection structure of the Laval tube, the throat tube, the swirl tube, the overflow tube, the internal swirl unit and the external swirl unit of the high-speed rotary exhaust separator.

Further preferably, the straight ducts are arranged all over the inner wall of an upper half of the exhaust catalytic converter.

Beneficial effects of the invention: (1) the filtering effect on PM in exhaust can be significantly improved, failures of the device caused by pipeline blockage resulting from PM accumulation is avoided or reduced, exhaust emission of the underground mining diesel vehicle is reduced, the exhaust purification efficiency is improved, blockage caused by PM in exhaust is avoided, secondary pollution caused by toxic and harmful gas is reduced, and the service life of the exhaust aftertreatment device is prolonged; (2) secondary pollution caused by $NH_3$ leaking can be avoided or reduced, the reaction rate of $NH_3$ and NOx is increased, the waste of a reductant is avoided, the use cost is reduced, threats to the health of workers underground mines are reduced, and a good underground working environment is created; and (3) the swirl structure-based exhaust aftertreatment device for an underground mining diesel vehicle is reasonable in design, easy to mount and low in cost.

DETAILED DESCRIPTION OF THE INVENTION

The invention will be further described below in conjunction with embodiments and accompanying drawings.

Figure 1:
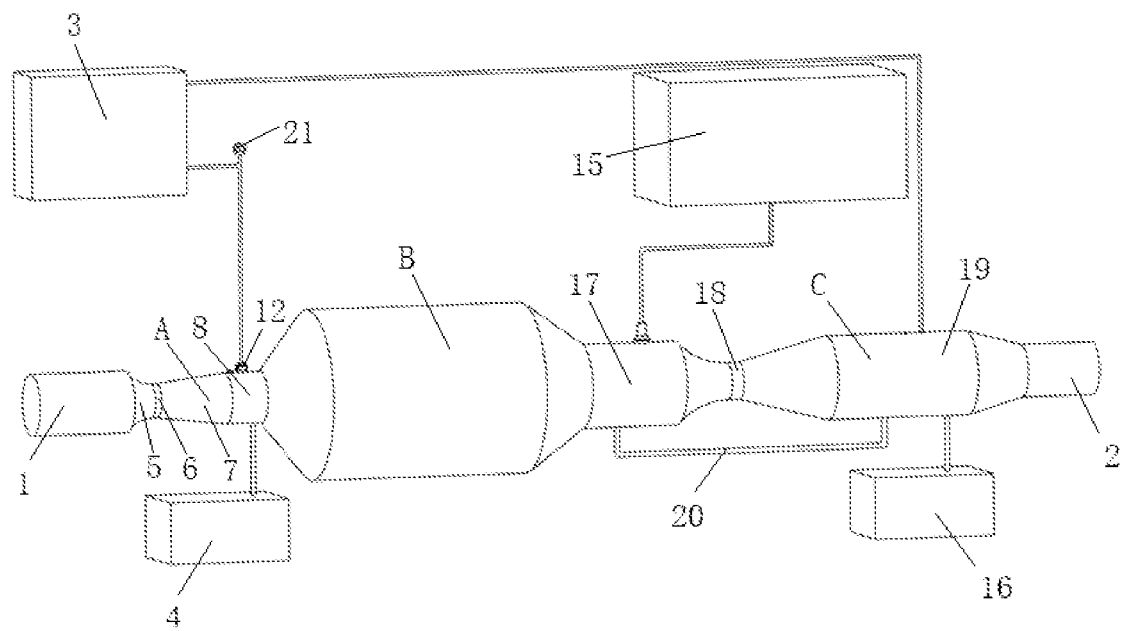
FIG. 1 is a schematic structural diagram of the invention.

As shown in FIG. 1, a swirl structure-based exhaust aftertreatment device for an underground mining diesel vehicle is mainly composed of a water tank 3, a PM collection tank 4, an inlet tube 1, a high-speed rotary exhaust separator A, an exhaust catalytic converter B, a circulating NOx selective catalytic reduction system C and an exhaust tube 2, wherein the inlet tube 1, the high-speed rotary exhaust separator A, the exhaust catalytic converter B, the circulating NOx selective catalytic reduction system C and the exhaust tube 2 are sequentially connected from front to back.

Figure 2:
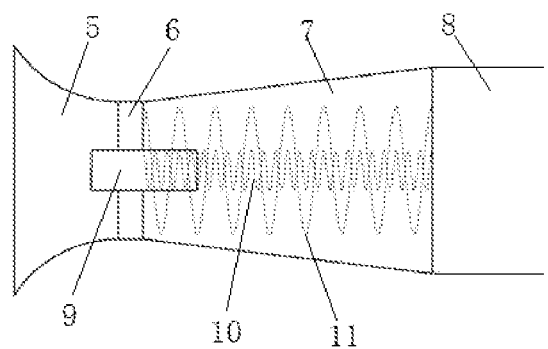
FIG. 2 is a schematic structural diagram of a high-speed rotary exhaust separator.

As shown in FIG. 1 and FIG. 2, the high-speed rotary exhaust separator A is mainly composed of a Laval tube 5, a throat tube 6, a swirl tube 7, a first deposition tube 8, an overflow tube 9, an internal swirl unit 10 and an external swirl unit 11.

The Laval tube 5, the throat tube 6, the swirl tube 7 and the first deposition tube 8 are sequentially connected from front to back. The Laval tube 5 is a constricted section, the swirl tube 7 is an expanded section, the Laval tube 5 is connected to the inlet tube 1, and the first deposition tube 8 is connected to the water tank 3 through a first pipeline and is connected to the PM collection tank 4 through a second pipeline. The PM collection tank 4 is used for collecting PM deposited in the first deposition tube 8 of the high-speed rotary exhaust separator A.

The overflow tube 9 for connecting the Laval tube 5 and the swirl tube 7 is mounted in the throat tube 6, and the internal swirl unit 10 and the external swirl unit 11 are mounted in the swirl tube 7. The internal swirl unit 10 and the external swirl unit 11 are as long as the swirl tube 7 and are both cylindrical helical springs. A front end of the internal swirl unit 10 is inserted into the overflow tube 9, and a rear end of the internal swirl unit 10 abuts against a back wall of the swirl tube 7. A front end of the external swirl unit 11 abuts against a front wall of the swirl tube 7, and a rear end of the external swirl unit 11 abuts against the back wall of the swirl tube 7. A swirl structure formed by the swirl tube 7, the internal swirl unit 10 and the external swirl unit 11 can separate out solid PM from exhaust during high-speed rotation by means of a strong centrifugal force.

The throat tube 6 is used for connecting the Laval tube 5 and the swirl tube 7. Exhaust enters the swirl tube 7 through the Laval tube 5 and the overflow tube 9, and rotates at a high speed under the combined action of the internal swirl unit 10 and the external swirl unit 11, and the swirl structure formed by the overflow tube, the internal swirl unit and the external swirl unit can significantly enhance high-speed rotation of the exhaust.

Automatic flow control valves 12 are arranged on the first pipeline and the second pipeline respectively, and a sprayer is mounted at a tail end of the first pipeline. A pressure sensor is arranged on the first deposition tube 8 and is used for monitoring a pressure change in the first deposition tube 8 and feeding back a signal to control the automatic flow control valves 12 to better control and regulate the water flow rate to control the spraying pressure of water. A temperature sensor is also arranged on the first deposition tube 8 and is used for monitoring a temperature change of the exhaust and giving a response timely in case of an abnormal high temperature.

When the exhaust rotating at a high speed reaches the first deposition tube, the pressure sensor transmits an electric signal to the automatic flow control valves, the water tank and the PM collection tank respectively, the automatic flow control valve at a joint of the first deposition tube and a connection tube of the water tank is used for controlling the flow rate of water, water is sprayed by the sprayer, and the automatic flow control valve at a joint of the first deposition tube and a connection tube of the PM collection tank is opened to allow PM to be deposited in the PM collection tank.

Figure 3:
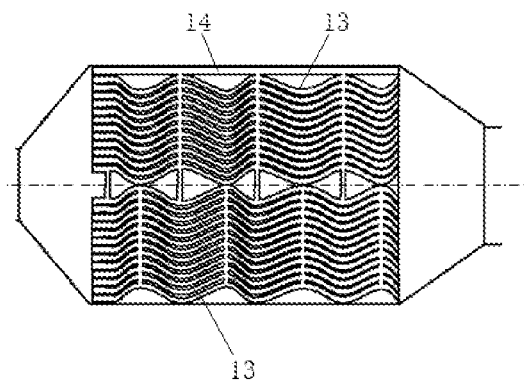
FIG. 3 is a schematic structural diagram of an exhaust catalytic converter.

As shown in FIG. 1 and FIG. 3, wavy ducts 13 and straight ducts 14 are arranged in the exhaust catalytic converter B. All ducts below a central axis are wavy ducts 13, front ends of the ducts are open, and tail ends of the ducts are closed. Ducts above the central axis are wavy ducts 13 and straight ducts 14, front ends of the dusts are closed, tail ends of the ducts are open, and the straight ducts 14 are arranged along an inner wall of the exhaust catalytic converter B.

Highest points, which protrude upwards, of the wavy ducts are peaks, and lowest points, which are concaved downwards, of the wavy ducts are troughs. The ducts below the central axis are connected at the peaks (see the white connecting line at the peaks). The wavy ducts above the central axis are connected at the peaks and are connected to the straight ducts at corresponding positions (see the white connecting lines at the peaks). The two ducts adjacent to the central axis are connected, and the peaks of the adjacent ducts on the central axis are connected to the troughs of the adjacent ducts below the central axis (see the four vertical passages perpendicularly intersecting with the central axis). Exhaust flows into the ducts below the central axis, part of PM is deposited in the troughs under the action of inertia and gravity to be separated from the exhaust, and remaining components in the exhaust enter the ducts above the central axis and flow out from the tail ends of the ducts above the central axis after further filtering and reaction.

To make maximum use of an inner cavity for arranging ducts to increase the contact area and reaction path between the exhaust and a catalyst, straight ducts are also arranged on the inner wall of the exhaust catalytic converter above the central axis, in addition to the wavy ducts. The ducts below the central axis are mainly used for depositing PM by means of the troughs, so no straight duct needs to be arranged. Exhaust flows in from the bottom and flows out from the top, and all the ducts are connected to ensure that the exhaust can flow out smoothly.

Inner walls of all the ducts are coated with a perovskite catalyst and preferably coated with a lanthanide perovskite catalyst. The straight ducts 14 are preferably arranged all over the inner wall of an upper half of the exhaust catalytic converter B.

As shown in FIG. 1, the circulating NOx selective catalytic reduction system C is mainly composed of an $NH_3$ storage tank 15, an $NH_3$ recycling tank 16, a multi-component mixing tube 17, a swirl reactor 18, a second deposition tube 19 and a return tube 20. The multi-component mixing tube 17, the swirl reactor 18 and the second deposition tube 19 are sequentially connected from front to back.

The multi-component mixing tube 17 is connected to the second deposition tube 19 through the return tube 20. The second deposition tube 19 is connected to the water tank 3 through a third pipeline, and the second deposition tube 19 is connected to the $NH_3$ recycling tank 16 through a fourth pipeline. The $NH_3$ storage tank 15 is connected to the multi-component mixing tube 17 through a fifth pipeline. An electric damper (not shown) is arranged in the vicinity of a tail end of the interior of the second deposition tube 19. Automatic flow control valves 12 (not shown) are arranged on the third pipeline, the fourth pipeline and the fifth pipeline respectively, preferably in the vicinity of tail ends of the corresponding pipelines, and sprayers are mounted at the tail ends of the third pipeline and the fifth pipeline. The $NH_3$ recycling tank 16 is used for collecting $NH_3$ not participating in reaction in the circulating NOx selective catalytic reduction system C.

An NOx sensor and a pressure sensor are arranged on the multi-component mixing tube 17. The NOx sensor is used for monitoring a concentration change of NOx, and the pressure sensor is used for monitoring a pressure change in the multi-component mixing tube and a spraying pressure of $NH_3$ to better control and regulate the flow rate of $NH_3$. When the concentration of NOx exceeds a concentration threshold, the NOx sensor rapidly transmits an electric signal to the corresponding automatic flow control valve and the $NH_3$ storage tank, and the automatic flow control valve controls the flow rate of $NH_3$, and $NH_3$ is sprayed by the corresponding sprayer.

An NOx sensor and an $NH_3$ sensor are arranged on the second deposition tube 19 and are used for feeding back a signal to control the electric damper and the corresponding automatic flow control valve 12. The NOx is used for monitoring the concentration change of NOx, and the $NH_3$ sensor is used for monitoring the concentration change of $NH_3$. When the concentration of NOx still exceeds the concentration threshold, the NOx sensor transmits an electric signal to the corresponding automatic flow control valve, the electric damper and the return tube, at this moment, the electric damper will be closed, and the exhaust flows back into the multi-component mixing tube through the return tube. When the concentration of NOx decreases below the concentration threshold, the NOx sensor transmits an electric signal to the corresponding automatic flow control valve, and the sprayers stop spraying. When the concentration of $NH_3$ exceeds a permissible concentration threshold, the $NH_3$ sensor transmits an electric signal to the corresponding automatic flow control valve, the water tank and the $NH_3$ recycling tank, the automatic flow control valve on the third pipeline controls the flow rate of water, water is sprayed by the corresponding sprayer, and at the same time, the automatic flow control valve on the fourth pipeline is opened to recycle $NH_3$ into the $NH_3$ recycling tank. When the concentration of $NH_3$ decreases below the concentration threshold, the $NH_3$ sensor transmits an electric signal to the automatic flow control valve on the third pipeline and electric damper, the corresponding sprayer stops spraying, and the electric damper is opened to allow the exhaust to be discharged.

Preferably, gauges 21 are arranged on the first pipeline and the third pipeline.

A carbon tetrachloride and dilute sulfuric acid mixed solution is contained in the $NH_3$ recycling tank 16, wherein carbon tetrachloride is located on a lower layer, dilute sulfuric acid is located on an upper layer, and the fourth pipeline is a drying tube which is connected to the bottom of the $NH_3$ recycling tank 16 to prevent $NH_3$ from flowing back or escaping.

The swirl reactor 18 is preferably composed of a Laval tube 5, a throat tube 6, a swirl tube 7, an overflow tube 9, an internal swirl unit 10 and an external swirl unit 11, the connection structure of which is the same as the connection structure of the Laval tube 5, the throat tube 6, the swirl tube 7, the overflow tube 9, the internal swirl unit 10 and the external swirl unit 11 in the high-speed rotary exhaust separator A and will not be repeated here. The swirl reactor not only can increase the reaction rate of NOx and $NH_3$ in exhaust, but also can realize sufficient mixing and reaction of NOx and $NH_3$.

The main technical issue to be settled by the invention is how to reduce, to the maximum extent, the concentration of NOx and PM in exhaust discharged by an underground mining diesel vehicle below the concentration threshold, how to avoid or reduce PM accumulation in the exhaust purification process of the underground mining diesel vehicle, and how to avoid or reduce $NH_3$ leaking under the precondition of guaranteeing sufficient reaction between NOx and $NH_3$.

What is claimed is:

1. A swirl structure-based exhaust aftertreatment device for an underground mining diesel vehicle, comprising a water tank (3), a PM collection tank (4), an inlet tube (1), a high-speed rotary exhaust separator (A), an exhaust catalytic converter (B), a circulating NOx selective catalytic reduction system (C) and an exhaust tube (2), wherein the inlet tube (1), the high-speed rotary exhaust separator (A), the exhaust catalytic converter (B), the circulating NOx selective catalytic reduction system (C) and the exhaust tube (2) are sequentially connected from front to back;

the high-speed rotary exhaust separator (A) comprises a Laval tube (5), a throat tube (6), a swirl tube (7) and a first deposition tube (8) which are sequentially connected from front to back, the Laval tube (5) is a constricted section, the swirl tube (7) is an expanded section, the Laval tube (5) is connected to the inlet tube (1), and the first deposition tube (8) is connected to the water tank (3) through a first pipeline and is connected to the PM collection tank (4) through a second pipeline; an overflow tube (9) for connecting the Laval tube (5) and the swirl tube (7) is mounted in the throat tube (6), an internal swirl unit (10) and an external swirl unit (11) which are as long as the swirl tube (7) are mounted in the swirl tube (7), and a front end of the internal swirl unit (10) is inserted into the overflow tube (9); automatic flow control valves (12) are arranged on the first pipeline and the second pipeline respectively, a sprayer is mounted at a tail end of the first pipeline, and a pressure sensor is arranged on the first deposition tube (8) and is used for feeding back a signal to control the automatic flow control valves (12);

wavy ducts (13) and straight ducts (14) are arranged in the exhaust catalytic converter (B); all ducts below a central axis are wavy ducts (13), front ends of the ducts are open, and tail ends of the ducts are closed; ducts above the central axis are wavy ducts (13) and straight ducts (14), front ends of the dusts are closed, tail ends of the ducts are open, and the straight ducts (14) are arranged along an inner wall of the exhaust catalytic converter (B); the ducts below the central axis are connected at peaks, the wavy ducts above the central axis are connected at peaks and are connected to the straight ducts at corresponding positions, the two ducts adjacent to the central axis are connected, peaks of the adjacent ducts on the central axis are connected to troughs of the adjacent ducts below the central axis, and inner walls of all the ducts are coated with a perovskite catalyst;

the circulating NOx selective catalytic reduction system (C) comprises an $NH_3$ storage tank (15), an $NH_3$ recycling tank (16), a multi-component mixing tube (17), a swirl reactor (18) and a second deposition tube (19), wherein the multi-component mixing tube (17), the swirl reactor (18) and the second deposition tube (19) are sequentially connected from front to back, the multi-component mixing tube (17) is connected to the second deposition tube (19) through a return tube (20), the second deposition tube (19) is connected to the water tank (3) through a third pipeline and is connected to the $NH_3$ recycling tank (16) through a fourth pipeline, the $NH_3$ storage tank (15) is connected to the multi-component mixing tube (17) through a fifth pipeline, an electric damper is arranged in the vicinity of a tail end of an interior of the second deposition tube (19), automatic flow control valves (12) are arranged on the third pipeline, the fourth pipeline and the fifth pipeline respectively, and sprayers are mounted at tail ends of the third pipeline and the fifth pipeline; an NOx sensor for monitoring a concentration of NOx and a pressure sensor for monitoring an internal pressure and a spraying pressure of $NH_3$ are arranged on the multi-component mixing tube (17), and an NOx sensor for monitoring the concentration of NOx, an $NH_3$ sensor for monitoring the concentration of $NH_3$, and a pressure sensor for feeding back a signal to control the electric damper and the corresponding automatic flow control valves (12) are arranged on the second deposition tube (19).

2. The swirl structure-based exhaust aftertreatment device for an underground mining diesel vehicle according to claim 1, wherein gauges (21) are arranged on the first pipeline and the third pipeline.

3. The swirl structure-based exhaust aftertreatment device for an underground mining diesel vehicle according to claim 1, wherein a carbon tetrachloride and dilute sulfuric acid mixed solution is contained in the $NH_3$ recycling tank (16), carbon tetrachloride is located on a lower layer, dilute sulfuric acid is located on an upper layer, the fourth pipeline is a drying tube which is connected to a bottom of the $NH_3$ recycling tank (16) to prevent $NH_3$ from flowing back or escaping.

4. The swirl structure-based exhaust aftertreatment device for an underground mining diesel vehicle according to claim 1, wherein the perovskite catalyst is a lanthanide perovskite catalyst.

5. The swirl structure-based exhaust aftertreatment device for an underground mining diesel vehicle according to claim 1, wherein a temperature sensor is also arranged on the first deposition tube (8).

6. The swirl structure-based exhaust aftertreatment device for an underground mining diesel vehicle according to claim 1, wherein the swirl reactor (18) is composed of a Laval tube (5), a throat tube (6), a swirl tube (7), an overflow tube (9), an internal swirl unit (10) and an external swirl unit (11), and a connection structure of the Laval tube (5), the throat tube (6), the swirl tube (7), the overflow tube (9), the internal swirl unit (10) and the external swirl unit (11) of the swirl reactor (18) is the same as the connection structure of the Laval tube (5), the throat tube (6), the swirl tube (7), the overflow tube (9), the internal swirl unit (10) and the external swirl unit (11) of the high-speed rotary exhaust separator (A).

7. The swirl structure-based exhaust aftertreatment device for an underground mining diesel vehicle according to claim 1, wherein the straight ducts (14) are arranged all over the inner wall of an upper half of the exhaust catalytic converter (B).

* * * * *